United States Patent [19]

Kawabe et al.

[11] Patent Number: 4,737,632

[45] Date of Patent: Apr. 12, 1988

[54] ARRAY ASSEMBLY OF PHOTOELECTRIC TOUCH PANEL WITH BENT SIDEWALLS

[75] Inventors: Shuichi Kawabe, Kogota; Hiroaki Sasaki, Furukawa, both of Japan

[73] Assignee: Alps Electric Co., Ltd., Japan

[21] Appl. No.: 864,708

[22] Filed: May 19, 1986

[30] Foreign Application Priority Data

May 17, 1985 [JP] Japan .............................. 60-73136[U]

[51] Int. Cl.$^4$ ............................................ G01V 9/04
[52] U.S. Cl. .................................................. 250/221
[58] Field of Search ...................... 250/221, 222.1, 208, 250/209, 216; 340/365 P, 555, 556, 557

[56] References Cited

U.S. PATENT DOCUMENTS 4,517,559  5/1985  Deitch et al. ........................ 250/221
4,591,710  5/1986  Komadina et al. ................. 250/221

Primary Examiner—David C. Nelms
Attorney, Agent, or Firm—Guy W. Shoup

[57] ABSTRACT

An array assembly of a photoelectric touch panel is characterized in that each of at least a light emitting array and a light receiving array is formed in an integral shape, and the substrate of each array is molded by flexible material, whereby the work of molding and assembling can be simplified.

2 Claims, 1 Drawing Sheet

ARRAY ASSEMBLY OF PHOTOELECTRIC TOUCH PANEL WITH BENT SIDEWALLS

BACKGROUND OF THE INVENTION

1. Field of the Invention

This invention relates to an array assembly of a photoelectric tough panel assembled around a faceplate into the form of a frame for generating infrared beams in the form of a matrix.

2. Description of the Prior Art

Hitherto, the array of this kind is configured as shown in FIG. 2. That is, in FIG. 2, reference numerals 1, 2, 3, and 4 indicate individual arrays which are assembled around a faceplate into the form of a frame, light emitting elements 5, 5, . . . are arranged on the arrays 1 and 2, and light receiving elements 6, 6, . . . are arranged on the arrays 3 and 4 disposed opposite to the arrays 1 and 2, so that infrared rays distributed in the form of a matrix are generated, these arrays 1, 2, 3, and 4 being connected mutually by cords 7, 7, . . . .

However, according to the conventional array assembly, two array boards for light emitting and further two array boards for light receiving of the same configuration had to be prepared, and the work of assembling them around the faceplate into the form of a frame was troublesome.

SUMMARY OF THE INVENTION

It is an object of the present invention to solve the foregoing problem of the prior art, thus to provide an array assembly of a photoelectric touch panel which is easily moldable and assemblable.

To achieve the foregoing object, the present invention is characterized in that each of at least a light emitting array and a light receiving array is formed in an integral shape, and a substrate of each array is molded by flexible material.

DESCRIPTION OF THE PREFERRED EMBODIMENT

Figure 1:
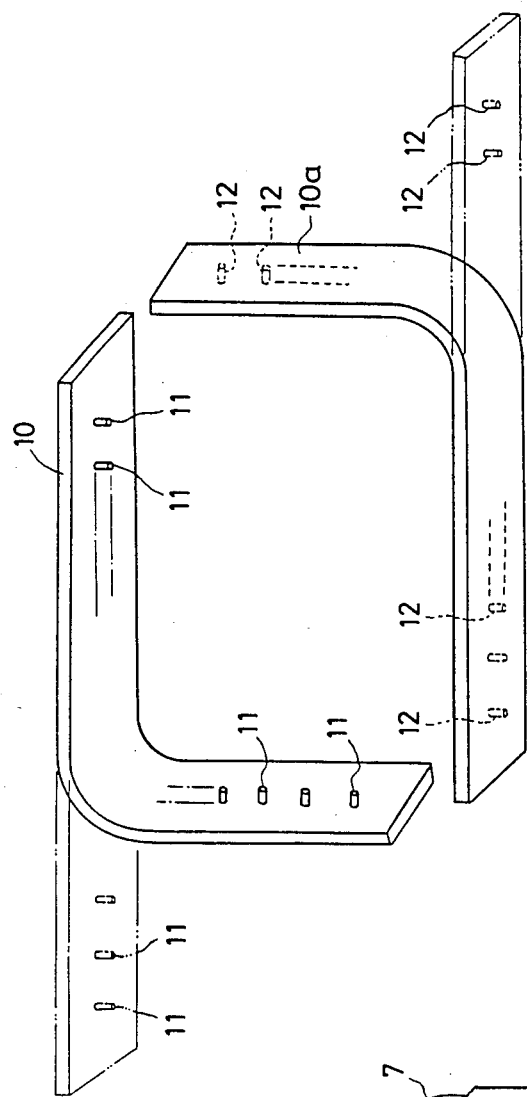
FIG. 1 is a perspective view showing the state of arrangement of an array assembly according to the present invention.
Figure 2:
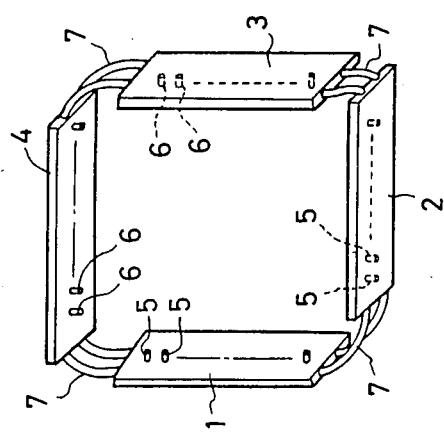
FIG. 2 is a perspective view showing the state of arrangement of the conventional array assembly.

An embodiment of the present invention will now be described with reference to the drawing.

In FIG. 1, reference numerals 10 and 10a indicate array substrates, these substrates 10 and 10a being molded by flexible material. The array substrate 10 is mounted with light emitting element chips 11, 11, . . . which are attached thereto at a certain spacing through bonding done by the use of a vacuum chuck, and can be changed in one step into an X- and Y-direction arrays by bending its straight portion illustrated by the imaginary lines.

Similarly, the array substrate 10a is mounted with light receiving element chips 12, 12, . . . which are attached thereto at a certain spacing through bonding done by the use of the vacuum chuck, and can be changed in one step into an X- and Y-direction arrays also through bending, this being positioned opposite to the light emitting array substrate 10.

If a spacer/shading member is attached to the thus formed array substrates 10 and 10a and lens members are provided on the shading member, optical elements, such as LEDs or phototransistors, are not required and a manufacturing process therefor can be omitted.

The array substrates 10 and 10a are made of flexible material, thus, can serve as a guide with respect to the shading member and the like because strain is prevented from appearing at the time of assembly.

As described hereinabove, although a pair of X- and Y-direction array substrates were required hitherto for each type of optical element, according to the present invention they can be manufactured in one step, and the assembly work of them into the form of a frame can be achieved easily.

What is claimed is:

1. An array assembly of light receiving and light emitting elements for forming a detection matrix of a photoelectric touch panel, comprising a one piece, elongated substrate made of bendable material, a first array of light elements arranged in a row on one side of said substrate, a second array of light elements on another side of said substrate, said substrate being bent at a right angle at an intermediate portion to provide said first array of light elements facing in one direction across the detection matrix and said second array of light elements facing in the perpendicular direction thereto across the detection matrix.

2. An array assembly according to claim 1, wherein said assembly comprises a first substrate having two arrays of light emitting elements, and a second substrate having two arrays of light receiving elements, said substrates being bent and positioned such that each array of light receiving elements is disposed in registration with a respective array of light emitting elements across a rectangular detection matrix.

* * * * *